United States Patent [19]

Graebe, Jr.

[11] Patent Number: 5,072,957
[45] Date of Patent: Dec. 17, 1991

[54] SHOPPING CART ACCESSORY

[76] Inventor: William F. Graebe, Jr., 208 Yorktown Dr., Collinsville, Ill. 62234

[21] Appl. No.: 159,771
[22] Filed: Feb. 24, 1988
[51] Int. Cl.⁵ .............................................. B62B 5/00
[52] U.S. Cl. ............................... 280/33.992; 108/152; 211/50; 248/309.4; 269/8
[58] Field of Search ............... 280/33.99 A; 108/134, 108/152; 40/308, 666; 269/8; 335/285; 248/309.4; 211/50, 90

[56] References Cited

U.S. PATENT DOCUMENTS

| | | | |
|---|---|---|---|
| 2,888,761 | 6/1959 | Miller | 40/10 |
| 3,129,032 | 4/1964 | Meyer et al. | 108/152 |
| 3,539,204 | 11/1970 | Keller | 281/45 |
| 3,912,291 | 10/1975 | Frisch | 280/33.99 A |
| 3,964,134 | 6/1976 | Newtson | 24/81 PC |
| 4,034,539 | 7/1977 | Economy | 40/308 |
| 4,156,318 | 5/1979 | Economy | 40/308 |
| 4,274,567 | 6/1981 | Sawyer | 224/42.43 |
| 4,423,888 | 1/1984 | Addison | 281/45 |
| 4,487,134 | 12/1984 | Foote | 108/44 |
| 4,583,753 | 4/1986 | Economy | 280/33.99 A |

FOREIGN PATENT DOCUMENTS

| | | | |
|---|---|---|---|
| 101042 | 2/1965 | Denmark | 63/90 |
| 2716938 | 10/1978 | Fed. Rep. of Germany . | |
| 1213262 | 3/1960 | France | 248/309.4 |

Primary Examiner—Charles A. Marmor
Assistant Examiner—Eric Culbreth

[57] ABSTRACT

A shopping cart accessory for providing a shopper with a support for a notepad or calculator has a platform and a support structure having a number of support members. The support members allowing a locking-type attachment of the accessory on a generally upright wall portion of the shopping cart.

12 Claims, 2 Drawing Sheets

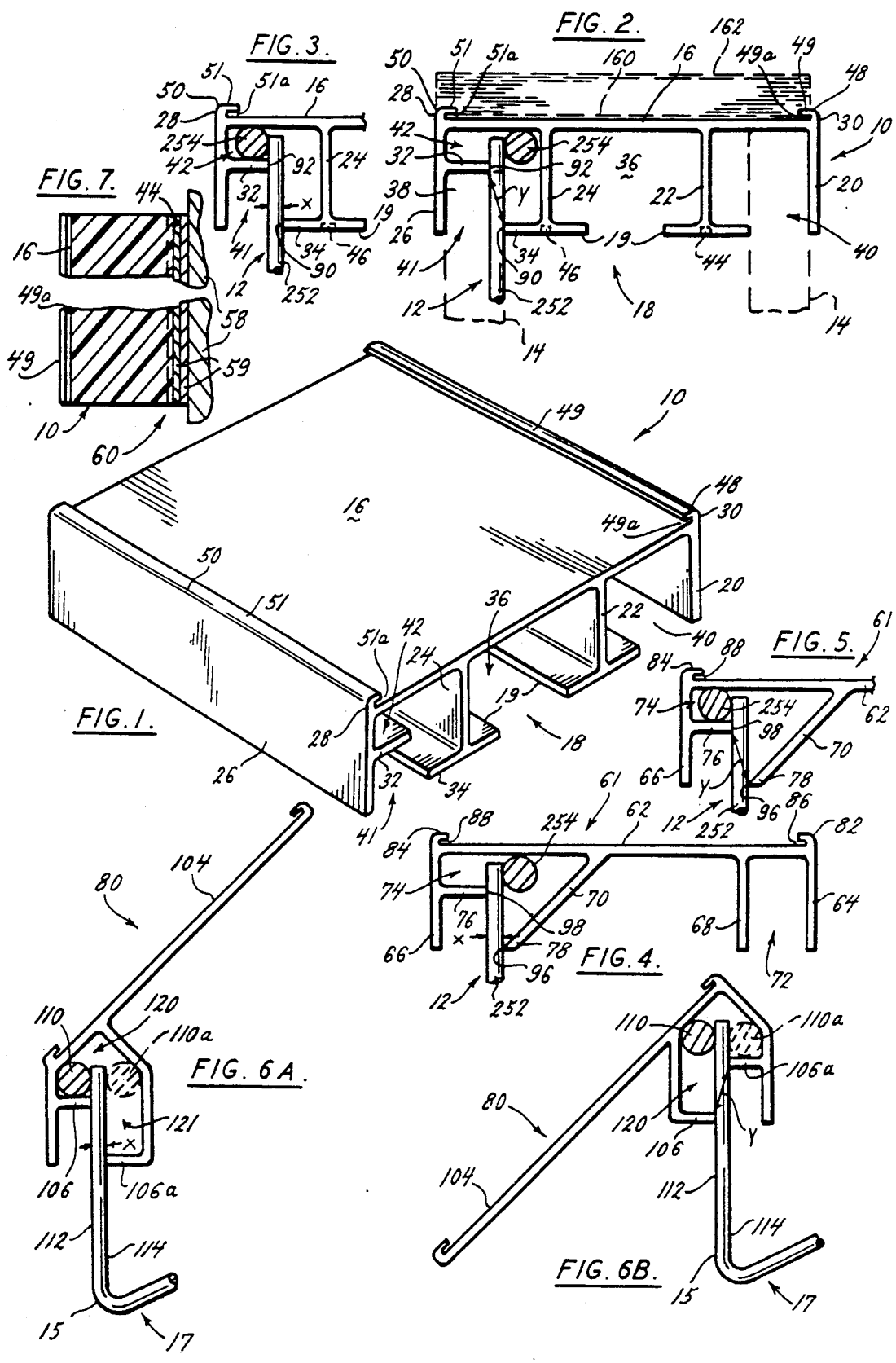

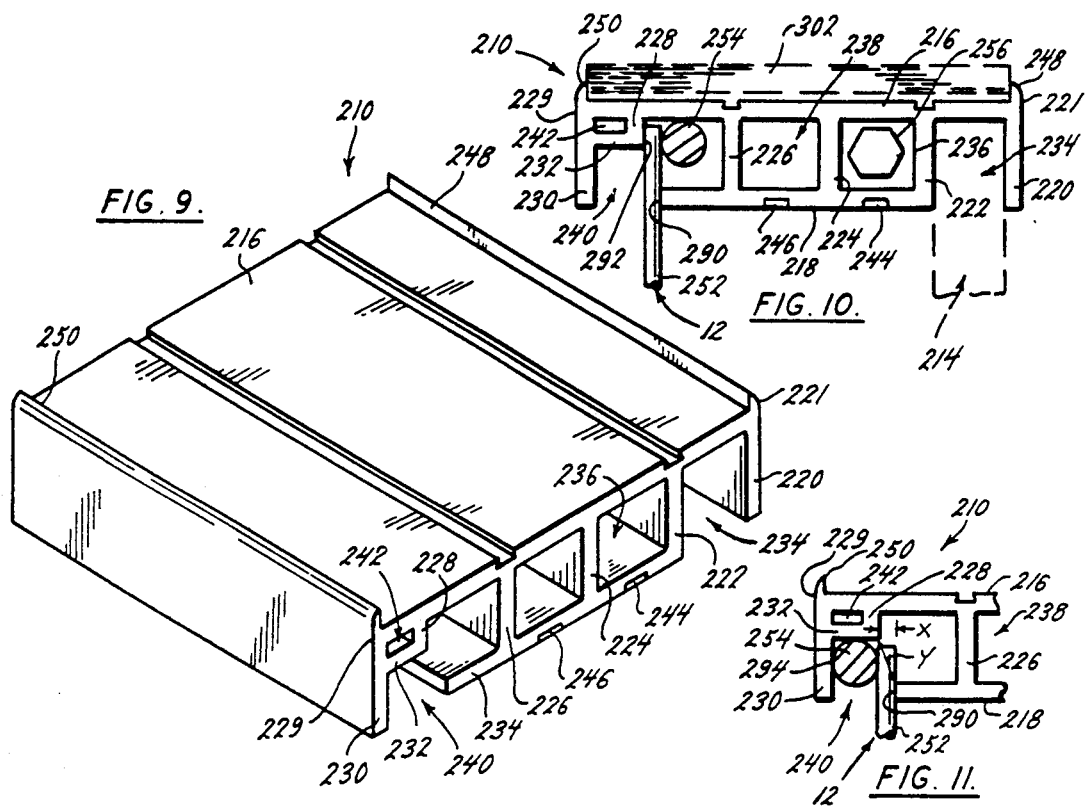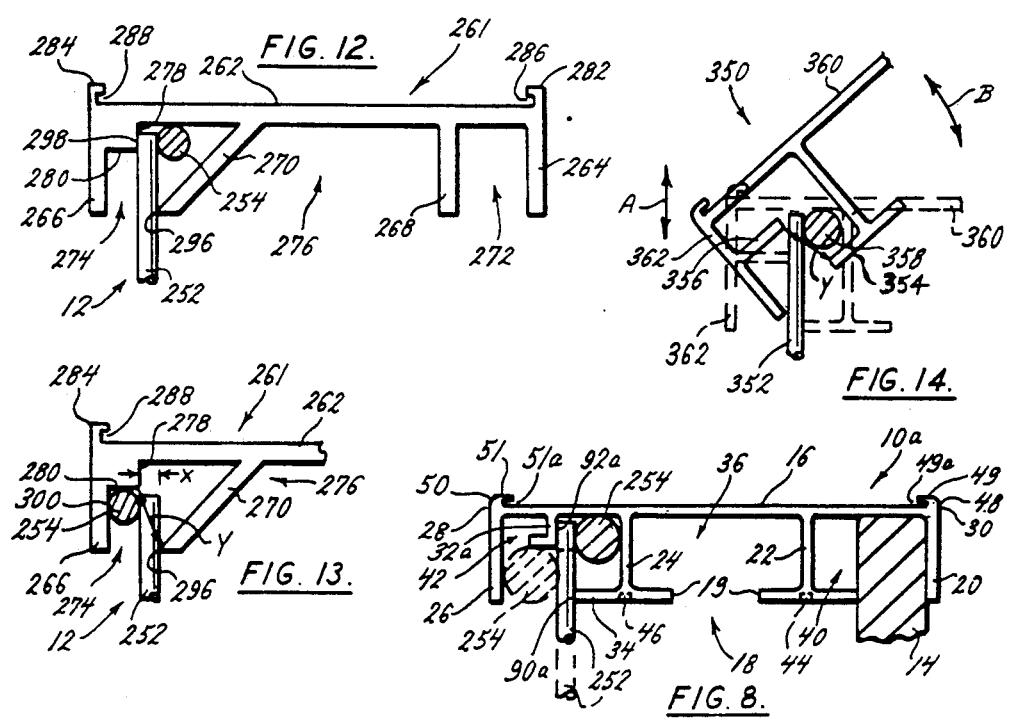

SHOPPING CART ACCESSORY

BACKGROUND OF THE INVENTION

This invention relates generally to a shopping cart or display accessory and more particularly to a shopping cart accessory for removable attachment to either wire or plastic shopping carts, store displays or other structures having a wall portion to which the accessory can be removably attached.

Typically, a shopping list of desired items is prepared in anticipation of a shopping trip. While at a store or stores a shopper is provided with a shopping cart. Substantially all of the shopping carts provided by stores are either metal wire or plastic carts. A metal wire cart is typically constructed with round metal wire in a system of vertical wires and one or more horizontal wires. An upper carrying portion is supported by a lower framework usually mounted on casters. A plastic cart is typically constructed with a plastic basket supported by a lower framework which is also usually mounted on casters. The construction of both types of shopping carts is well known.

While in a store the previously prepared shopping list is referred to often by the shopper. A convenient place is typically found on which to rest the shopping list for easy and quick reference as the shopper proceeds through the store. As the shopping cart is filled with items to be purchased it is often the case that the list must be moved about. Very often a sheet of paper on which the list is written will blow out of the shopping cart or down into the items already in the cart. A shopper with a better memory than most might keep a shopping list in a pocket only to be referred to occasionally, but for the rest of us the shopping list must be handy for quick reference. What is desired is a convenient accessory that will hold a shopping list securely for easy reference. The accessory should also leave the shopper's hands free. Ideally, the accessory would be removably attachable to the shopping cart and easily transportable by the shopper between home and the store.

Others have attempted to provide a solution to these and other problems. U.S. Pat. No. 3,964,134 refers to a Grocery Cart Clip Attachment comprising a clip adapted to be removably applied to the side of the grocery cart. U.S. Pat. No. 4,034,539 refers to an Attachment for Shopping Cart for use on a shopping cart with a collapsible infant seat which is used in part to support the attachment in an upright and generally horizontal position. U.S. Pat. No. 2,888,761 refers to a Directory and Clip Board Combination designed for attachment to a shopping cart to serve as a support for the user's papers and as a display panel for a store directory or other printed matter provided by the merchant. U.S. Pat. No. 3,539,204 refers to a Clip Board for a Shopping Cart for attachment to a cart for holding grocery lists. U.S. Pat. No. 3,912,291 refers to a Shopping Cart Shelf Assembly dimensioned and adapted for attachment to a conventional shopping cart. U.S. Pat. No. 4,156,318 refers to an Attachment for a Shopping Cart providing a substantially flat and stable writing surface for the shopper, for use on a supermarket shopping cart of the type having a collapsible infant seat pivotally connected to its rear wall. U.S. Pat. No. 4,274,567 refers to a Shopping Cart Organizer for use on a shopping cart of the type having a transversely extending handle and a forwardly spaced-apart transversely extending rod, the organizer including a substantially flat desk panel provided with clip means on an outer surface for securement of a note pad or similar writing material. U.S. Pat. No. 4,423,888 refers to a Store Cart with Clipboard Item-Retention Means including a store cart with a clipboard fixed thereto for retaining items such as discount coupons or shopping lists used in the store and the support of the clipboard is by a loose but positive connection to the cart handle. U.S. Pat. No. 4,487,134 refers to a Portable Worktable for use with a shopping cart and includes a flat table member supportable by the sides of the cart and positionable to substantially cover the open top of the cart and a plurality of legs for removably retaining the table member on the cart. U.S. Pat. No. 4,583,753 refers to a Desk Attachment for Shopping Cart directed to a desk apparatus attachable to a shopping cart for providing a stable surface supported at an angle convenient for viewing or writing by the shopper. A West German Patent, No. 2716938, appears to refer to a calculator support attachable to a grocery cart.

The shopping cart accessory of the present invention solves these and other problems in a manner not disclosed in the known prior art.

SUMMARY OF THE INVENTION

The shopping cart accessory of the present invention provides a work area that can be used by a shopper during a shopping trip. The work area can provide means for supporting a notepad, for example, to keep a shopping list. The work area can provide means to support a calculator, a note pad, a pen, or a pencil that might be needed during the shopping trip. The shopping cart accessory includes supporting members connected to the work area. The supporting members provide opposing supporting abutment against a generally upright wall portion of a shopping cart's basket. The supporting members are spaced apart a first distance. The first distance is an effective gap between the supporting members measured as if they were opposite each other. The first distance should be no less in magnitude than the width of the generally upright wall portion of the shopping cart. The supporting members are spaced apart a second distance The second distance is an actual distance between the closest points of the supporting members. The second distance should be no less in magnitude than the width of any cart structure that must pass between the supporting members in order to removably attach the shopping cart accessory to the shopping cart. The cantilevered weight of the shopping cart accessory tends to hold the shopping cart accessory in place on the shopping cart.

Use of the accessory of the present invention is not limited to shopping carts The accessory provides a supporting surface that has other uses as well in stores and supermarkets, for example, to provide a support surface for displaying advertising or coupons, or both. Displays or display areas often have a wall portion used to confine items in the display or the wall portion may define a particular display area. Supporting members connected to the supporting surface of the accessory provide supporting abutment against opposing faces of the wall portion. The supporting members are spaced apart a distance that provides an effective gap between the supporting members measured as if they were opposite each other. This distance should be no less in magnitude than the distance between the opposite faces of the wall portion. The supporting members are spaced apart another distance equal to the actual distance between the closest points of the supporting members. This other distance should be no less in magnitude than the width between any structure that must pass between the supporting members in order to removably attach the accessory to the wall portion. The two distances defined herein are equivalent to the first and second distance, respectively, described in the preceding paragraph. The cantilevered weight of the accessory tends to hold the accessory in place on the wall portion.

It is an aspect of the present invention that the shopping cart accessory provides a work area for a shopper's convenience and use during a shopping trip.

It is another aspect of the present invention that the shopping cart accessory is removably attachable to a shopping cart or wall portion of a display structure.

It is another aspect of the present invention that the accessory is generally mountable on either side of the upright wall portion of the shopping cart or wall portion of a display structure.

It is another aspect of the present invention that the work area or support surface of the accessory can be provided with either a generally horizontal or a sloped platform depending upon the intended use or application.

It is another aspect of the present invention that the accessory can be removably attached to substantially all styles of shopping carts, thereby allowing a shopper to take the accessory from store to store for use during a shopping trip.

It is another aspect of the present invention that the accessory embodiment is easily carried by the shopper whether in hand, pocket or purse.

It is another aspect of the present invention that the accessory provides a stable, flat platform that can support paper to be written on, for example, for a shopping list as the shopper moves through the store.

It is another aspect of the present invention that the accessory provides for easy mounting when not in use.

It is another aspect of the present invention that the accessory "locks" on the shopping cart or display structure. This "locking" results from a multi-step movement required to attach the accessory. Once the accessory is "locked" on it is difficult to remove by accident and must be removed in a multi-step removal movement.

It is another aspect of the present invention that the accessory can be extruded from plastic thereby providing a relatively inexpensive item that can be cut to a desired length to suit a particular need.

These and other aspects and features of the present invention will be better understood and appreciated from the following detailed description of embodiments thereof, selected for the purpose of illustration and shown in the accompanying drawings.

BRIEF DESCRIPTION OF THE DRAWINGS

FIG. 1 is a perspective view of an embodiment of the shopping cart accessory of the present invention;

FIG. 2 is an elevation view of the embodiment of the shopping cart accessory of FIG. 1;

FIG. 3 is a partial elevation view of the embodiment of the shopping cart accessory of FIG. 1;

FIG. 4 is an elevation view of another embodiment of the shopping cart accessory of the present invention;

FIG. 5 is a partial elevation view of the embodiment of the shopping cart accessory of FIG. 4;

FIGS. 6A and 6B are elevation views of two additional, related, embodiments of the accessory of the present invention;

FIG. 7 is a partial section view of the present invention showing a story method;

FIG. 8 is an elevation view of another embodiment of the accessory of the present invention;

FIG. 9 is a perspective view of another embodiment of the present invention;

FIG. 10 is an elevation view of the embodiment of the present invention of FIG. 9;

FIG. 11 is partial elevation view of the embodiment of the present invention of FIG. 9;

FIG. 12 is an elevation view of another embodiment of the present invention;

FIG. 13 is a partial elevation view of the embodiment of the present invention of FIG. 12; and FIG. 14 is a diagrammatic representation of a typical series of movements that "lock" an accessory of the present invention on a generally upright wall portion of a shopping cart basket or similar structure.

DESCRIPTION OF THE PREFERRED EMBODIMENT

Referring now by characters of reference to the drawings and first to FIG. 1 it will be understood that a shopping cart accessory generally indicated by reference character 10 is intended for use with a metal wire shopping cart 12, a plastic shopping cart 14 (FIG. 2), or a wall means, typically a wall portion 15 of a display 17 as shown schematically in FIGS. 6A and 6B.

The accessory includes a work area or supporting surface provided by a platform 16. The accessory has a generally depending and lower base portion 18. As shown, the base portion 18 has a generally flat base 19 and the accessory can be used in a flat, resting position. The platform of a preferred embodiment is provided with a plurality of depending legs, as shown in FIGS. 1 and 2, including a first leg 20, a second leg 22, a third leg 24 and a fourth leg 26. The first leg depends from an edge portion 30 of the platform 16. The fourth leg depends from an opposing edge portion 28 of the platform 16.

A pair of generally opposing support members are each connected to the platform 16 through their common connection to intermediate structure as shown in the drawings. The opposing support members include a supporting member 32 and another supporting member 34. The supporting members 32 and 34 extend generally outwardly from the adjacent legs 24 and 26 and generally towards each other.

The embodiment shown in FIGS. 1-3 also includes a partially enclosed aperture 36 defined by second leg 22, third leg 24, platform 16 and base portion 18. The first leg 20 and the generally flat base portion 19 of the second leg 22 define a slot 40. The fourth leg 26, supporting member 32 and supporting member 34 define a slot 41. The supporting member 32 and platform 16 define an opening or channel 42. In the bottom of the base portion 18 of a preferred embodiment are two optional bottom channels or slots (shown dashed), a first bottom channel 44 and a second bottom channel 46 for receiving a supporting means for use in storing the accessory as shown, for example in FIG. 7. Extending generally upwardly from the opposing edges of platform 16 are a first sidewall 48 and a second sidewall 50. A flange 49 and another flange 51 extend inwardly to define opposing grooves 49a and 51a, respectively, in cooperation with the platform 16 A backing member 160 of a notepad 162 can be fit into the opposing grooves as shown in the drawings. This is just one method of affixing a notepad to the shopping cart accessory 10. For example, in lieu of the flanges 49 and 51, a spring biased clip may be attached to the platform to hold a notepad or individual sheets of note paper.

Another preferred embodiment is shown in FIGS. 4 and 5 and includes another shopping cart accessory 61, shown in elevation in FIG. 4 and partial elevation in FIG. 5. This embodiment of the present invention generally includes a work area or support surface provided by platform 62. A plurality of legs depend from the platform 62 including a leg 64, another leg 66, an intermediate leg 68 and an angled leg 70. The one leg 64 and the intermediate leg 68 define a slot 72.

A channel 74 is defined by a supporting member 76 and the platform 62. The supporting member extends out from the leg 66 and is connected to the platform 62 by the common connection to the leg 66. The distal end of angle leg 70 provides a supporting member portion 78.

Extending generally upwardly from the edges of the platform 62 are opposing sidewalls, a sidewall 82 and another sidewall 84. In the preferred embodiment shown in FIGS. 4 and 5 the sidewalls 82, 84 include opposing grooves 86 and 88, respectively, intended to hold a notepad as previously described. It will be understood that a clipboard style clip could be attached to the platform 62 to hold the notepad or sheets of paper.

The embodiment of FIGS. 4 and 5 illustrates how the overall appearance of the accessory of the present invention can be modified while still providing the structure necessary to provide cantilever support for the accessory on the generally upright wall portion of the shopping cart basket.

In order that those skilled in the art will fully understand the versatility of the present invention and its equivalents, additional preferred embodiments have been shown in FIGS. 6A and 6B. The embodiment in FIG. 6A shall be discussed first.

An accessory 80 illustrates a work surface or support surface inclined at an angle to a wall portion 15 as in platform 104. The accessory 80 is shown supported by the wall portion 15 of a display structure 17. The supporting structure and elements of the accessory 80 are substantially similar to those shown in the shopping cart accessory 10. It will be understood that the platform 104 could be oriented either generally horizontal or at an angle other than that shown in FIG. 6A, perhaps for use with a different style display, for example, or as shown in FIG. 6B.

As illustrated in FIGS. 6A and 6B the support of the accessory 80 does not limit the present invention to any particular design. For the accessory itself, whether it be intended for use on a shopping cart, a display or a suitable structure supported by an individual, for example, a store employee taking inventory, stocking shelves or pricing stock, in which instances the platform 16 or 62 or 104 could be expanded in size to support lists of products, inventory lists, or calculators. As one example, a store employee could carry a clip including a generally upright wall portion attached to a belt or shoulder strap with the accessory supported on the wall portion due to the cantilever support of the platform on the wall portion.

A variation of FIGS. 1-3 is shown in FIG. 8 and identified by reference character 10a. Like reference characters refer to like or corresponding elements. The variation provides an illustration of a modification in the supporting member arrangement. Referring first to FIG. 8, an L-shaped supporting member 32a depends from the bottom or lower surface of the platform 16. The relationship between supporting members 32a and 34 is equivalent to the relationship between supporting members 32 and 34 in FIGS. 1-3 and the supporting members 76 and 78 in FIGS. 4 and 5.

Another shopping cart attachment 210 described hereinafter is shown in FIGS. 9 through 11. It should be noted that this embodiment and another embodiment shown in FIGS. 12 and 13 and described hereinafter illustrate how overall appearance of the accessory of the present invention can be modified while still providing the structure necessary to support the accessory on the general upright wall portion of the shopping cart basket or display structure or similar structure, for example, as shown in FIGS. 6A and 6B and described above.

The attachment 210 includes a support means 216 for supporting one or more items such as a note pad or calculator. A plurality of generally rigid legs depend from the support means. A channel means 240 provides support for the shopping cart attachment 210 on the sidewall of a shopping cart. The channel means 240 is defined by a combination of legs and support means 216. The channel means provides a plurality of contact points between the channel means and the shopping cart basket so as to reactively support the shopping cart attachment 210 towards either an inside or an outside direction with respect to the basket. It is therefore provided that support of the shopping cart attachment of the present invention is a function of a moment resulting from the contact between the channel means and the basket brought about by the weight of the accessory cantilevered out from the generally upright wall portion of the shopping cart basket or similar structure.

As specifically shown in the embodiment of FIGS. 9 through 11 the shopping cart attachment 210 includes the support means 216 such as a platform, a base 218. The first leg 220 depends from an edge 221 of the platform 216. A second leg 222 extends from the platform 216 to the base 218. The second leg 222 is inwardly spaced from the first leg 220.

A slot 234 is defined by the first leg 220, platform 216 and the second leg 222. The slot 234 supports the shopping cart attachment 210 on a plastic shopping cart 214 as shown in dashed outline in FIG. 10.

The third leg 224 extends from the platform 216 to the base 218. The third leg 224 is inwardly spaced from the second leg 222.

A first closed aperture 236 is defined by the second leg 222, the third leg 224, the platform 216 and the base 218.

A fourth leg 226 extends from the platform 216 to the base 218. The fourth leg 226 is spaced apart from the third leg 224 as shown in the drawings.

A second closed aperture 238 is defined by the third leg 224, the fourth leg 226, the platform 216 and the base 218.

A fifth leg 228 depends from the platform 216. The fifth leg 228 is inwardly spaced from an opposing edge 229 of the platform.

A sixth leg 230 depends from the opposing edge 229. A wall 232 extends between the fifth leg 228 and the sixth leg 230. A channel 240 is defined by the base 218, the fourth leg 226, the platform 216, the fifth leg 228, the wall 232 and the sixth leg 230. The channel 240 provides a plurality of contact points 290, 292 or 294 for supporting the shopping cart attachment 210 on a metal wire formed wall 12 of the wire shopping cart. An aperture 242 can be formed during the extrusion process.

Upstanding, opposing wall members 248 and 250 can be provided for removably holding a notepad 302 as shown in FIG. 10. An insert 256 can be provided for removably holding a writing instrument, such as a pencil.

The shopping attachment 210 receives the vertical wire support 252 and horizontal top rod 254 as shown in FIGS. 10 and 11.

Another embodiment of the present invention having a modified cross-section is shown in FIGS. 12 and 13 and includes another shopping cart attachment embodiment 261. This embodiment includes another platform 262, one leg 264, another leg 266, and an intermediate leg 268. An angle leg 270 depends from the bottom of platform 262. A slot 272 is formed between legs 264 and 268 for receiving the upper edge of a plastic shopping cart 214 as previously described.

Formed at the opposing edge of shopping cart attachment 261 is one channel 274 and another channel 276. The one channel 274 is partially formed by vertical surface 278 and horizontal surface 280. The shopping cart attachment 261 receives the vertical wire support 252 and horizontal top rod 254 as shown in FIGS. 12 and 13.

The contact points react against the shopping cart or other structure due to the cantilevered weight of the accessory. At least up to the breaking point of the accessory material, the more weight the tighter the purchase of the accessory. This applies to the metal shopping cart and the plastic shopping cart. The weight or force of writing on the notepad tends to increase the stability of the accessory, thereby providing the shopper with a stable, flat platform on which to write.

Upwardly extending from platform 262 is one sidewall 282 and another sidewall 284. One groove 286 and another groove 288 are formed in the sidewall for generally receiving the backing portion of a typical note or scratch pad. It will be clear from the drawings and from the specification that the contact points 296, 298 or 300 are provided in the embodiment illustrated in FIGS. 12 through 13, contact points 90 and 92 in the embodiment of FIGS. 1-3, contact points 96 and 98 in the embodiment of FIGS. 4,5 and contact points 90a, 92a in the embodiment of FIG. 8.

Typical shopping cart styles, dimensions, and operation of the accessory of the present invention will now be described.

A typical shopping cart is constructed of either metal wire or rods or it is constructed from plastic. The metal wire or rod cart is typically constructed with round metal wire having a diameter 0.120" including a generally upright portion 252. In most metal shopping carts a horizontal top rod 254 having a diameter 0.310" or less extends around the top to brace and generally reinforce the vertical rods. Some cart styles also include additional horizontal rods (not shown). The upper carrying portion of the cart with its vertical and horizontal rods is usually supported by a lower framework (not shown) which is in turn mounted on four casters.

The other style of shopping cart that also sees significant use is the plastic shopping cart. The typical plastic shopping cart is constructed with a plastic basket having a generally upright portion 14 or 214 having a thickness 0.500" supported by a lower framework. The framework (not shown) is usually mounted on four casters (not shown). It will be understood that the number of casters and the details of the lower framework of either style of shopping cart can and does vary.

Use of the accessory of the present invention on the plastic shopping cart is readily accommodated by use of slot 40, 41, 72, 234, 240 or 272. The accessory fits over the top edge 38 of the plastic shopping cart 14 as shown, for example, in FIG. 1. The inclusion of slot 40, 41, 72, 234, 240 or 272 greatly increases the usefullness of the accessory to the user. The accessory can be taken from store to store notwithstanding the style of shopping cart provided.

The platform (16, 62, 216, 262 or 104) is cantilevered out from the generally upright portion 252 of the shopping cart or wall portion 112 of member 114 as shown in FIGS. 6A and 6B. It will be understood that due to the cantilever the weight of the accessory is transferred from the accessory to the generally upright portion 252, or 112 through the supporting abutment of the supporting members 32 and 34, 76 and 78, 230, 232 and 234, 266 and 278, or 106, 106a. The horizontal top rod 254, 110 or 110a can face either direction as shown in the drawing figures.

Two important dimensions will now be discussed. A dimension "X" identifies a first distance that is not less than the width of the generally upright portion 252 (for example 0.120 inches for a typical wire shopping cart) or wall portion 112 of display 17. A dimension "Y" identifies a second distance that is not less than the diameter of the top horizontal rod 254 or a combined distance of any additional cart structure that must pass through, such as the generally upright wall structure (for example 0.310 inches as a minimum or a combined distance of 0.430 inches) or upper edge 110 or 110a of wall portion 15.

As described above the accessory is removably attachable on a variety of structures including shopping carts of either wire or plastic basket construction The accessory, when used with a shopping cart can be mounted with the platform 16 to the inside or the outside of the cart, or the right side or the left side of the basket, thereby providing convenience for the shopper and for either right handed or left handed individuals. The accessory can be mounted as described in view of the fact that channels 42, 74, 240, 274, 120 or 121 are provided for receiving the top rod 254, 110 or 110a.

Numerous embodiments have been shown and described in order to clarify how the overall appearance of any one accessory can be modified to suit production requirements or aesthetic tastes while still providing the structure necessary to support the accessory as intended. Some of the various modifications will now be discussed.

The embodiment shown and described in FIGS. 1, 2 and 3 represents a preferred production prototype. This embodiment provides a multiple attachment or mounting system as shown in the drawing figures and described in detail hereinabove. The accessory 10 can be attached, for example, to the generally upright wall portion of the metal shopping cart 12. Attachment of the accessory 10 to the shopping cart 12 is independent of the diameter of the top horizontal rod 254 with respect to this embodiment. This embodiment can be mounted to either side of upright portion 252, thereby accomodating shopping cart constructions having the top horizontal rod 254 to either the inside or the outside of the cart's basket. Thus, both right-handed shoppers and left-handed shoppers will find the accessory easy and convenient to use. Furthermore, two channels 40 and 41 are provided that will accept the plastic cart 14. The channel 40, as shown in the drawings, FIG. 1, does provide a deeper penetration of the plastic cart 14 and may provide a more stable attachment of the accessory to the cart.

Another embodiment shown and described in FIG. 8 represents another preferred production prototype. The embodiment of FIG. 8 also provides a multiple attachment or mounting system as shown and described in detail, hereinabove. The overall height of the embodiment of FIG. 8 has been reduced with respect to the embodiment of FIGS. 1–5. Typically, it is believed that the thickness or height of the embodiment of FIGS. 8–13 can be reduced by approximately 25% with respect to the embodiment of FIGS. 1–5. The height reduction can be accomplished by modifying support member 32 as shown generally by support member 32a. It should be noted, however, that the mounting or attachment of the accessory becomes dependent in one mounting direction upon the combined diameter of the horizontal top rod 254 and the vertical rod 252. That is, if the two dimensions, the diameter of the vertical rods and diameter of the horizontal top rod 254 is greater in magnitude than the "Y" dimension, then the accessory 10a can be attached to the shopping cart basket with the horizontal top rod 254 adjacent only leg 26.

The "locking" type attachment of an accessory 350 of the present invention to a generally upright wall portion or structure 352 will now be generally described with reference to FIGS. 1–3 and FIG. 14. The accessory 350 is attached to the generally upright wall portion or structure 352 in a multi-step movement. First, the accessory 350 is held at an angle with respect to the generally upright wall portion 352 and then the top of the wall portion or structure is inserted ("A") between supporting members 354 and 356 (through the gap having a dimension "Y").

Then, once a horizontal top rod member 358 goes through the gap "Y", the accessory 350 is dropped in an arc ("B") to bring a platform portion 360 into a desired position (e.g., horizontal as in FIGS. 1–3 or at an angle as in FIGS. 6A, 6B). An additional movement is required with respect to the embodiments generally conforming to FIGS. 1–6B. The additional movement is required when the horizontal top rod member 358 is facing or adjacent depending leg 362. The additional movement consists generally of translation of the accessory 350 to the right (as shown, for example, in FIG. 3).

The accessory is now "locked" on the shopping cart basket or other structure 352 as hereinafter briefly described. It will be understood that one aspect of the accessory being "locked" on to the cart or structure is that it, the accessory, cannot be knocked off or easily dislodged from the cart or structure since a reverse of the attachment steps is required to remove the accessory. Thus, while an accidental bump may move or jiggle the accessory, it is highly unlikely that it will actually be knocked off.

It will be understood that the configuration of the supporting members is subject to the modifications previously described with respect to reducing the overall height of the accessory of the present invention. The "locking" type attachment of the accessory 10a of the present invention will now be generally described with reference to FIG. 8. If the accessory is to be attached with the top horizontal rod 254 adjacent the leg 26, then the accessory need only be lowered down on to the generally upright wall structure 252 as shown dashed in FIG. 8. If the accessory is to be attached with the top horizontal rod 254 adjacent the intermediate leg 24, then the accessory is first lowered on to the generally upright wall structure 252, next the accessory is moved to the left (relative to the view in FIG. 8) and finally, the accessory is again lowered until the "locking" relationship is obtained as shown in FIG. 8. In this manner the embodiment of the present invention in FIG. 8 is also "locked" in position.

The embodiment of FIGS. 1–3 is typically approximately 3 inches wide and approximately 1 inch thick. The length can vary. If an extrusion process is used to manufacture the accessory in plastic, then the desired length can be readily cut from the extrusion. The dimensions are such that the accessory can be easily carried, for example, in the shopper's hand, pocket or purse. Furthermore, manufacturing the accessory from plastic can provide a slight flexibility that can be advantageous in cases where the dimensions of the components of the cart or other structure are slightly larger or the accessory tolerances are on the low side, or both, since the flexibility will provide an amount of give, thereby allowing attachment of the accessory as desired.

The accessory mounts on wire shopping carts, plastic shopping carts, wall portions of displays or can be mounted to be carried by individuals. The accessory configuration is independent of the overall structure to which it is removably attached if that structure contains a generally upright portion, e.g., vertical metal wire portion 252, or wall portion 112. The accessory's stability is a result of the cantilevered weight of the accessory bearing on the structure in abutting relation to the supporting members.

The embodiments of the present invention shown in FIGS. 1, 2, 8, 9 and 10 include a plurality of slots or channels 44, 46 or 244, 246 formed in the base portion 18 or 218, respectively. The channels (it should be noted that one channel would suffice or a number of channels, more than two (2), as well) receive a support means 60 for supporting the shopping cart accessory when not attached to the shopping cart. The support means in one preferred embodiment consists of magnetic strips 59 in the channels. A magnetic plate member may be suitably located, for example, in a kitchen to hold the shopping cart accessory for storage when not in use as shown in FIG. 7. It will be understood that the magnetic strips can also be used to mount the accessory on a refrigerator 58, stove or other metal surface Similarly, in another preferred embodiment VELCRO strips are received by the channels. A mating piece of VELCRO may be suitably located. It will be understood that the channels are preferred if it is desired to flush-mount the accessory for storage. Alternatively, the magnetic strips or VELCRO strips could be attached to the bottom of base portion 18 or 218, however, this would expose them to possible damage during normal use of the accessory.

From the foregoing description those skilled in the art will appreciate that all aspects of the present invention are realized.

It will be understood that although numerous embodiments have been shown other variations are possible. A calculator can be used in lieu of the notepad.

Other modifications may be made to the embodiments illustrated and described without departing from the spirit of the invention. It is not intended that the scope of this invention be limited to a particular embodiment. Rather, the scope of the invention is to be determined by the following claims and their equivalents.

What I claim is:

1. A substantially rigid shopping cart accessory for a shopping cart having generally upright side wall portions and at least one top rim rod, comprising:
   (a) a work area for use by a shopper with respect to a shopping trip;
   (b) a generally horizontal supporting member for abutting engagement with a generally upright portion of a shopping cart and providing supporting abutment below the top rim rod and against the generally upright side wall portion of the shopping cart, the one generally horizontal supporting member connected to the work area and substantially proximate a side wall portion, whereby the generally horizontal support member tends to resist any rotational torque effect due to a moment arm resulting from a cantilever support of the accessory mounted on the cart side wall; and
   (c) another generally horizontal supporting member for abutting engagement with the generally upright side wall portion of the shopping cart and providing opposing supporting abutment at a position below the top rim rod and further below the other generally horizontal member against the generally upright side wall portion of the shopping cart, the one and the other supporting members of the accessory spaced apart generally horizontally a first distance equal to or greater than the width of the generally upright side wall portion of the shopping cart, and generally vertically a second distance equal to or greater than the combined width of the generally upright portion of the shopping cart and any additional cart structure received thereby that must be passed between the one and the other supporting member in order to removably attach the shopping cart accessory to the shopping cart while maintaining the shopping cart accessory work area in a relatively perpendicular relationship with the vertical side wall, independent of whether the shopping cart accessory is mounted inside or outside a basket portion of the shopping cart, the other supporting member connected to the work area, whereby, the reaction resulting from the cantilever between the supporting members and received portion of the shopping cart provide support for the cantilevered weight of the shopping cart accessory and thereby restrain the shopping cart accessory removably in place on the generally upright side wall portion of the shopping cart.

2. The shopping cart accessory as set forth in claim 1, wherein:
   (d) the generally horizontal supporting member and the work area define a channel for receiving at least one top rim rod connected at a generally top portion of the upright portion of the shopping cart and supporting the shopping cart accessory independently of the top portion.

3. The shopping cart accessory as set forth in claim 2, wherein:
   (e) the other generally horizontal supporting member and the work area another channel for receiving at least one top rim rod and supporting the shopping cart accessory independently of the top portion.

4. The shopping cart accessory as set forth in claim 1, further comprising:
   (d) a substantially flat base portion connected to a supporting leg depending from the work area said base portion comprising one of the horizontal supporting members;
   (e) another substantially flat base portion connected to another supporting leg depending from the work area; and
   (f) base portion including support means for supporting the shopping cart
   accessory when not attached to the shopping cart.

5. The shopping cart accessory as set forth in claim 1, further comprising:
   (d) the work area including a platform with at least two opposing edges, and
   (e) a plurality of sidewalls extending generally upwardly from the opposing edges of the platform.

6. The shopping cart accessory as set forth in claim 5, wherein:
   (f) the sidewalls are spaced apart so as to removably receive a note pad for the convenient use of the shopper.

7. A substantially rigid accessory for providing a supporting surface as set forth in claim 1, wherein:
   (d) the one generally horizontal supporting member is located on one side of the accessory for receiving at least one top rim rod and providing supporting abutment against a face of the wall means and below any top rim rod or rods, the supporting member connected to the support surface;
   (e) the other generally horizontal supporting member is located for receiving at least one top rim rod and providing supporting abutment against an opposite face of the wall means and below the top rim rod or rods, the one and the other supporting members of the accessory spaced apart a generally horizontal distance equal to or greater than the distance between the opposite faces of the wall means and a generally vertical distance equal to or greater than the combined width of the wall means and any additional structure that must be passed between the one end the other supporting member in order to removably attach the accessory to the wall means, the other supporting members connected to the supporting surface, whereby the cantilevered weight of the accessory provides a moment force that is sufficient to hold the accessory in place on the wall means.

8. The shopping cart accessory as set forth in claim 1, wherein:
   (d) the horizontal support members are spaced apart a distance measured generally parallel to the side wall and the horizontal support members provide a locking system; and
   (e) a substantially horizontal lip member extends into a shopping cart upright portion receiving channel and preventing the shopping cart accessory from being accidentally dislodged from the side wall, wherein removal of the shopping cart accessory requires a plurality of sequential movements of the accessory.

9. The shopping cart accessory as set forth in claim 1, wherein:

(d) a channel provided generally below the work area provides for shopping accessory support on a shopping cart without the top rim rod.

10. A shopping cart attachment comprising:
(a) a platform,
(b) a base,
(c) a first leg depending from an edge of the platform,
(d) a second leg extending from the platform to the base, the second leg inwardly spaced from the first leg,
(e) a slot defined by the first leg, base, platform and the second leg, the slot supporting the shopping cart attachment on a plastic shopping cart,
(f) a third leg extending from the platform to the base, the third leg inwardly spaced from the second leg,
(g) a first closed aperture defined by the second leg, the third leg, the platform and the base,
(h) a fourth leg extending from the platform to the base, the fourth leg spaced part from the third leg,
(i) a second closed aperture defined by the third leg, the fourth leg, the platform and the base,
(j) a fifth leg depending from the platform, the fifth leg inwardly spaced from an opposing edge of the platform,
(k) a sixth leg depending from the opposing edge,
(l) a wall extending between the fifth leg and the sixth leg, and
(m) a channel defined by the base, the fourth leg, the platform, the fifth leg, the wall, and the sixth leg, the channel providing a plurality of contact points for supporting the shopping cart attachment on either a wire shopping cart or a plastic shopping cart.

11. A shopping cart attachment comprising:
(a) a platform;
(b) a first leg depending from an edge of the platform;
(c) a generally T-shaped leg depending from the platform the generally T-shaped leg inwardly spaced from the first leg,
(d) a slot defined by the first leg, platform, and one of the T-shaped legs, the slot supporting the shopping cart attachment on a shopping cart without a top rim rod construction;
(e) another generally T-shaped leg depending from the platform and inwardly spaced from the one T-shaped leg;
(f) a second leg depending from an opposing edge of the platform, the second leg spaced apart from the other generally T-shaped leg;
(g) a wall extending generally horizontal and inward from the second leg;
(h) an upper channel defined by the second leg, the platform, and the generally horizontal wall; and
(i) a lower channel defined by the second leg, generally horizontal wall, and the second T-shaped leg, whereby the upper channel and the lower channel, the generally horizontal wall, and the opposing T-shaped portion provide a plurality of contact points for supporting the shopping cart attachment on either a wire shopping cart or the shopping cart without the top rim rod construction.

12. The shopping cart attachment as set forth in claim 11, wherein:
(j) the horizontal wall, the upper channel and the lower channel provide a locking system; and
(k) the horizontal wall, the upper channel and the lower channel prevent the shopping cart attachment from being accidentally dislodged from the shopping cart, wherein removal of the shopping cart attachment requires a plurality of sequential movements of the attachment.

* * * * *